March 3, 1959 R. E. GUNTHER 2,875,998
VEHICULAR SPEED INDICATORS
Filed July 2, 1956
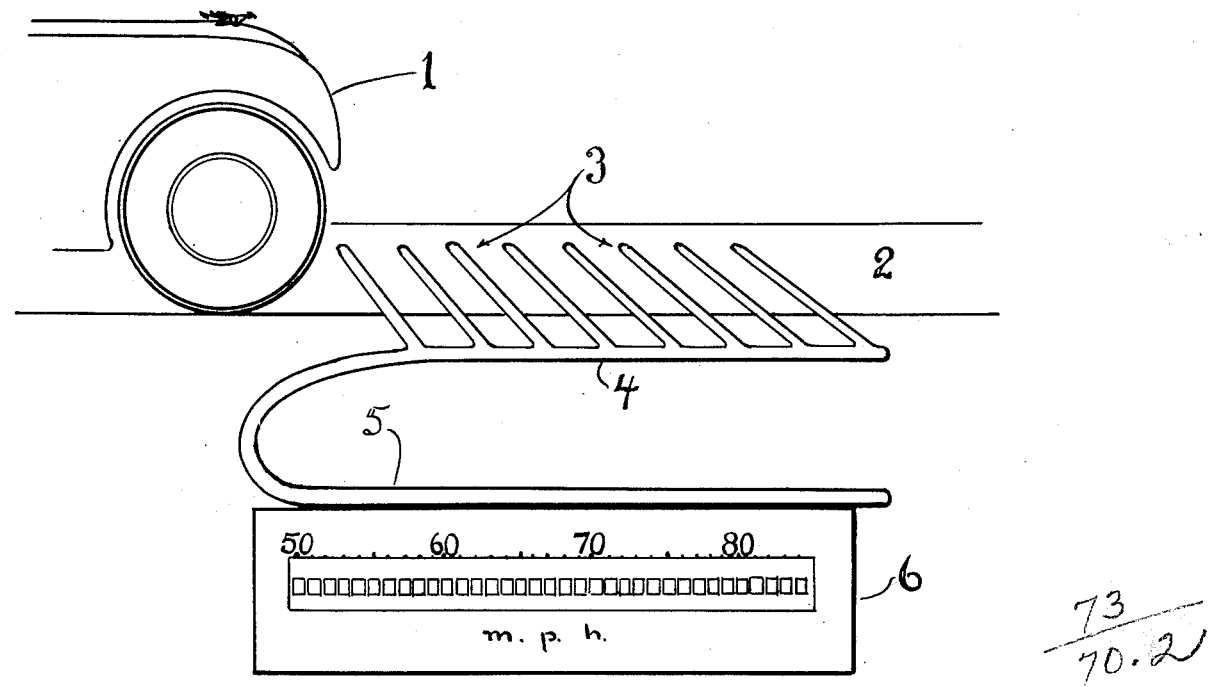
INVENTOR—
Roland Eric Gunther

United States Patent Office 2,875,998
Patented Mar. 3, 1959

2,875,998

VEHICULAR SPEED INDICATORS

Roland E. Gunther, Princeton Junction, N. J.

Application July 2, 1956, Serial No. 595,257

3 Claims. (Cl. 264—1)

This invention relates to a device for indicating the speed of a vehicle to an observer not aboard the vehicle under scrutiny.

The control of the speed of motor vehicles today constitutes an important function of our law enforcement agencies. The methods employed in most cases consist either of following the vehicle in question with a police car and when the latter is at substantially the same speed, as the other car, reading the speedometer on the official car, or by the use of radar. The chasing method has many shortcomings; among them are the danger to the pursuing officials when speeds are high and traffic is heavy, and the limited amount of actual control that can actually be exerted. The radar speed observation system overcomes much of these disadvantages. It can monitor many more vehicles and with much greater safety. However, the apparatus is necessarily elaborate and consequently costly to purchase.

It is an object of this invention to provide a means of indicating the speed of passing vehicles, which is relatively simple, rugged and inexpensive.

It is also an object of this invention to provide means of monitoring the speed of moving vehicles without the need of power supplies, so that the monitoring can be done at any desired location along a road.

It is a further object of providing a speed indicating device that has as an intrinsic characteristic extreme ease of portability.

These and other objects and the way in which they are attained are brought forth in the following description and the related drawing.

In the drawing is shown the front end of a car, indicated by the numeral 1 moving from left to right on a road 2. On the roadway in the path of the car is a grid 3. The grid 3 is made of elastic tubing and is filled with a liquid. Connected to the grid 3 is a header 4 which itself extends into a lead 5. The header 4 and the lead 5 communicated with the grid and containing the same liquid constitute a closed system with the grid. The lead 5 terminates adjacent to and in contact with a vibrating reed frequency meter 6.

The operation of the device is as follows. As a vehicle such as the one shown runs over the grid 3 there is set up in the liquid content of the grid tubes and its associated header 4 a series of pressure pulses. The grid is advantageously placed so that its tubes are consecutively equally spaced from each other, and in this way the pressure pulses set up in the liquid system is created in a definite frequency for any specific speed of the moving car. The series of pulses set up by the car is transmitted by the lead 5 to the vibrating reed frequency meter 6 which in turn registers the frequency of the series of pulses. Since this frequency with a particular grid is always characteristic of a corresponding car speed the frequency meter is calibrated to read directly in miles per hour.

It is obviously possible to interpose electric or electronic means of transmitting the vibratory signal created in the grid to the vibrating reed meter for remote reading, and it is expressedly to be understood that this can be done without departing from the scope of this invention.

With this device as the nucleus of elaborations it becomes feasible to monitor traffic with great ease and with a minimum of personal attendance. The excursion of the reeds when set into vibration can, for instance, be made use of to establish electrical contact between selected reeds and a conductive striking surface, so that the vibration of these reeds can cause closing of a circuit which signals a driver of excessive speed or it may be used to trigger a camera shutter for making a picture of the offending driver, his vehicle and the meter showing his speed.

Since the basic device does not require a power pack or line current it can be set up easily and quickly at almost any location along a road. The grid may be permanently placed in a road, and the meter hooked up to the system for use, or the grid may be incorporated in a mat to make the whole device portable.

I claim:

1. A vehicular speed indicator comprising a liquid filled elastic tubular grid, said grid comprising a multiplicity of essentially parallel equally spaced elements, a header connected to the elements of said grid, and a vibration frequency meter sensitive to any vibratory effects that may be set up in said grid and header combination by its being run over by a car.

2. In a vehicular speed indicator the combination of a grid, said grid consisting of equally spaced elastic tubular elements, a header connecting said elements and a tubular appendage to said header, with said grid, said header and said tubular appendage all being filled with liquid and constituting a closed system, and a vibration frequency meter connected to and sensitive to vibrations in said liquid system.

3. In a vehicular speed indicator the combination of a liquid filled grid for placement on a roadway in the path of vehicles to be monitored, said grid being made up of equally spaced elastic tubular elements, a tubular liquid filled header connecting said grid elements, a tubular liquid filled lead connecting said header with a remotely located vibration frequency meter.

References Cited in the file of this patent

UNITED STATES PATENTS 2,419,099   Wall _____ Apr. 15, 1947

FOREIGN PATENTS 210,708   Germany _____ June 8, 1909